Oct. 25, 1927. 1,646,846
F. B. YINGLING
FRICTION DRIVE TILE PRESS
Filed Feb. 6, 1925 5 Sheets-Sheet 3
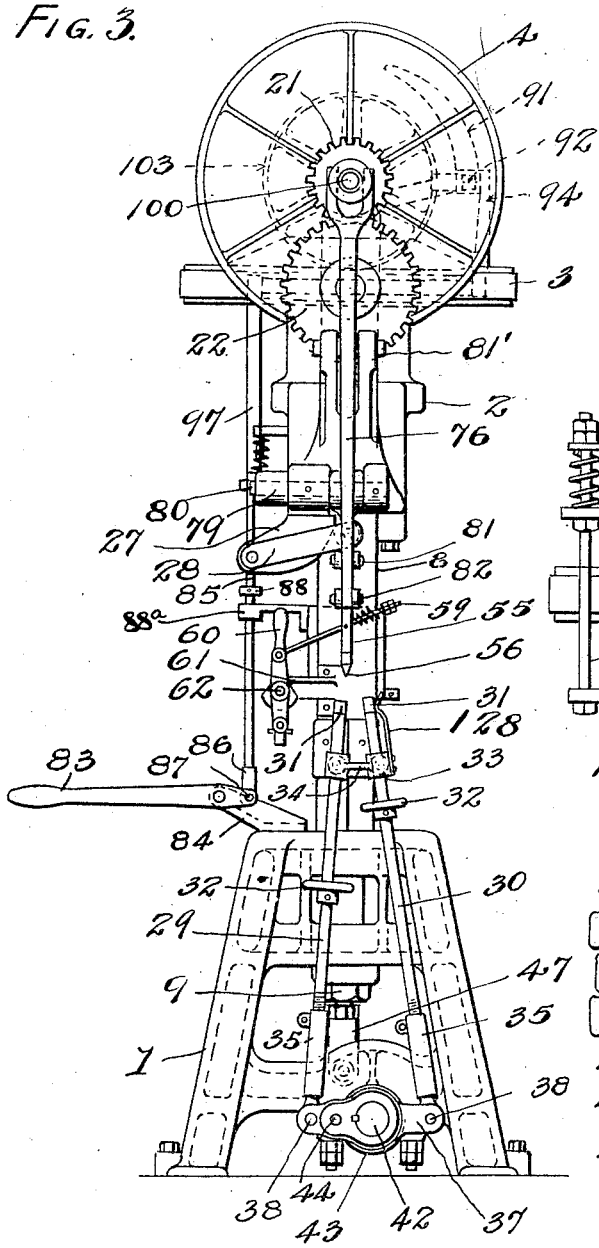
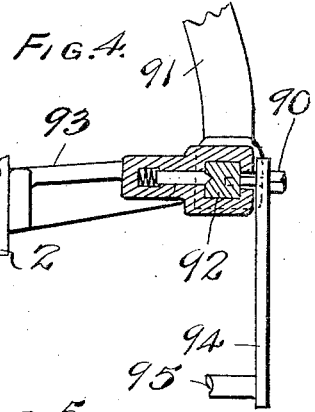
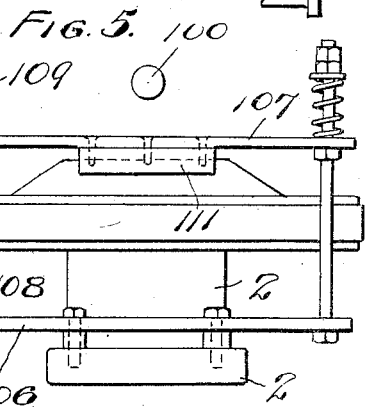
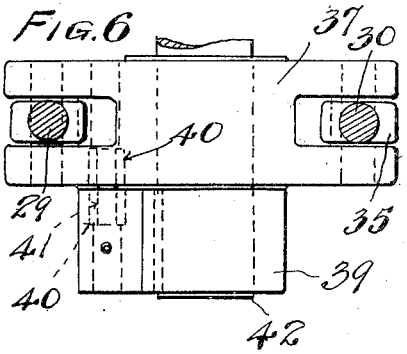
INVENTOR
FRANK B. YINGLING
BY
ATTORNEY Oct. 25, 1927.  1,646,846
F. B. YINGLING
FRICTION DRIVE TILE PRESS
Filed Feb. 6, 1925  5 Sheets-Sheet 4
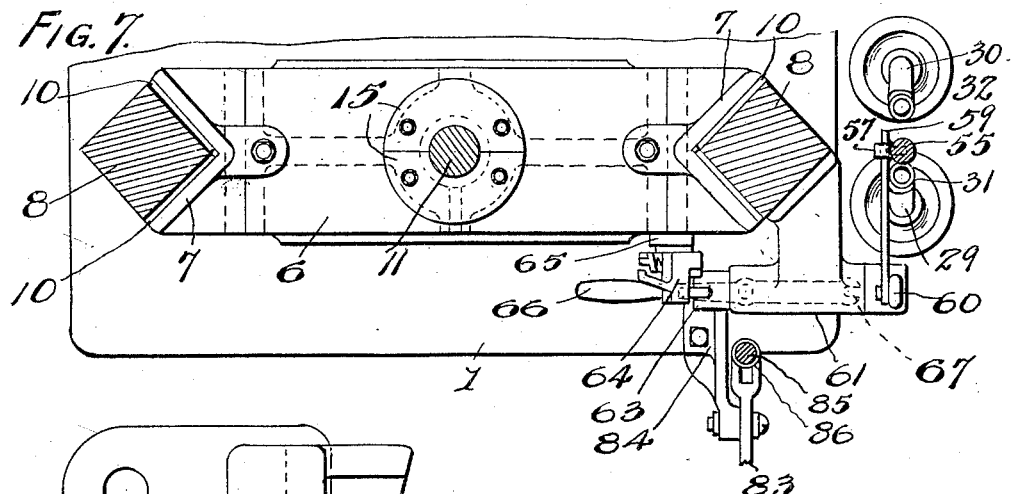
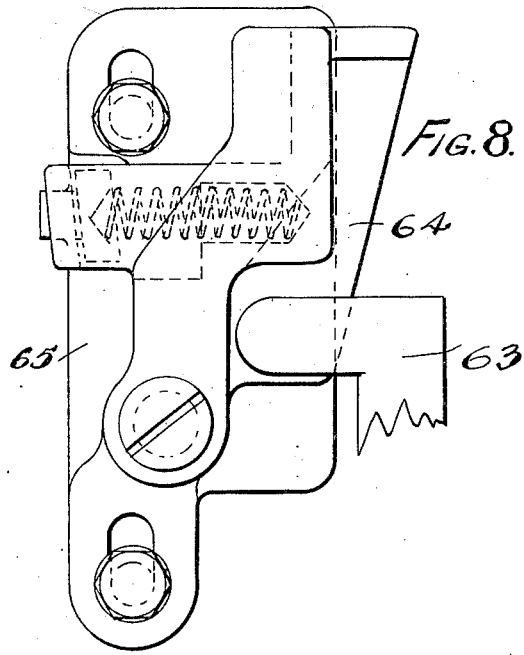
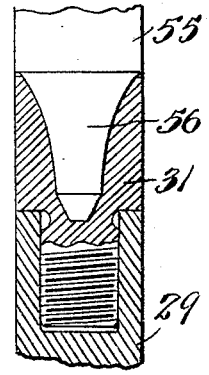
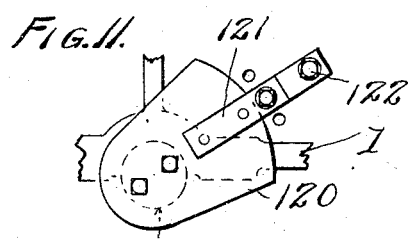
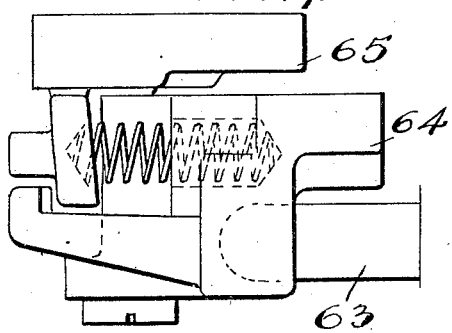
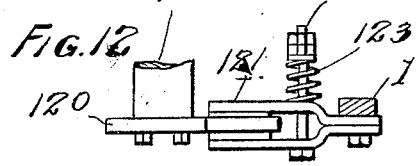
INVENTOR
FRANK B. YINGLING.
BY
ATTORNEY Oct. 25, 1927.  
F. B. YINGLING  
FRICTION DRIVE TILE PRESS  
Filed Feb. 6, 1925    5 Sheets-Sheet 5

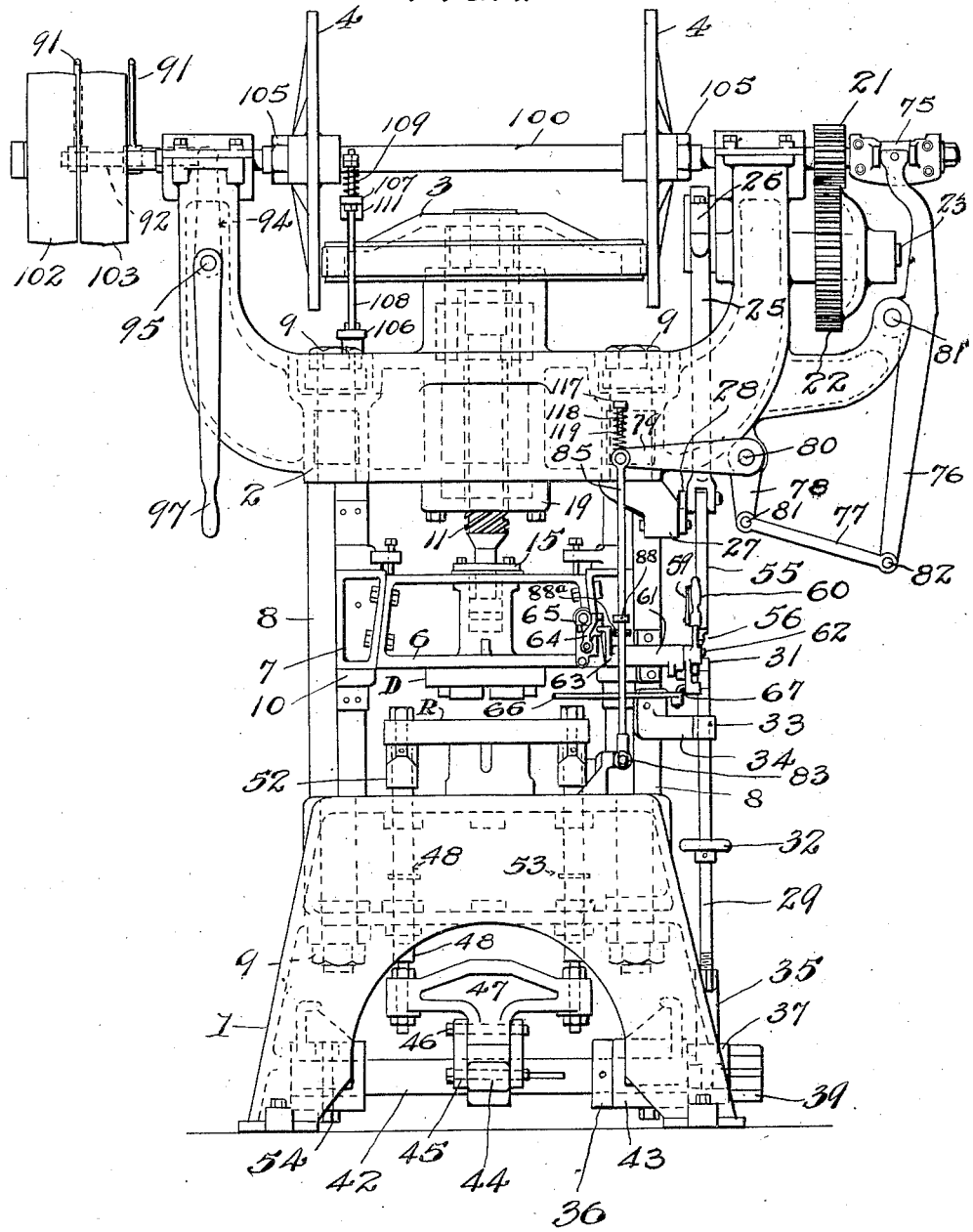

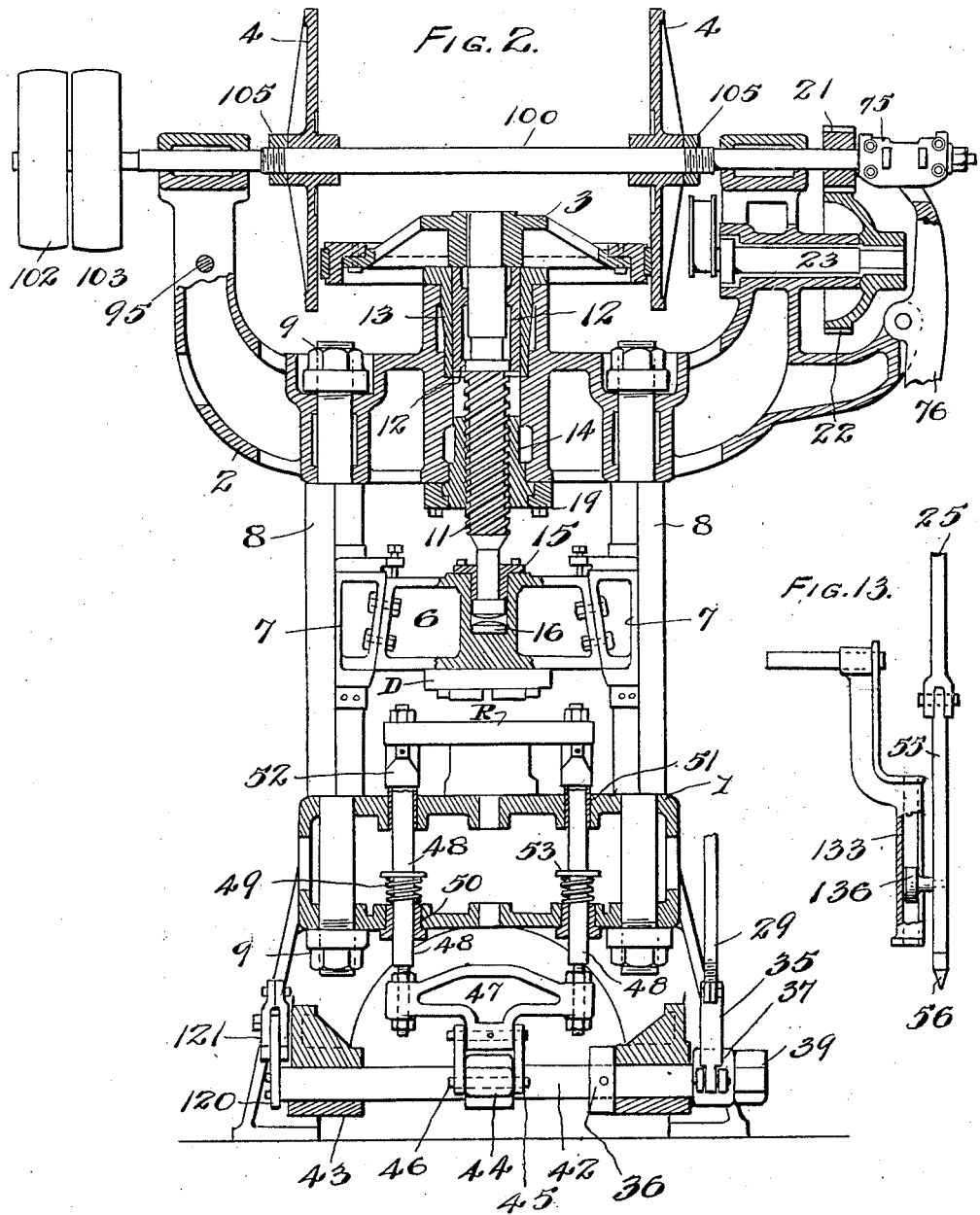

Frank B. Yingling  
INVENTOR

BY Fenelon B. Brock  
ATTORNEY

Patented Oct. 25, 1927.

1,646,846

UNITED STATES PATENT OFFICE.

FRANK B. YINGLING, OF HAMILTON, OHIO.

FRICTION-DRIVE TILE PRESS.

Application filed February 6, 1925. Serial No. 7,349.

Further on in the specification will be found a description of the various figures of the drawing to which attention is directed.

Primarily this machine is designed for the purpose of pressing tile, although obviously certain features of the machine are adapted for other purposes.

The base of this press is made in one piece or part giving it rigidity and stability, and at the same time cheapening the construction. The top bracket is also made in one piece and for the same reason.

The fly wheel screw is supported by the sleeve and bush in the top bracket, thus effectively taking care of the side thrust and providing means for renewing worn parts. The fly wheel is dished so that the rim takes the strain of the side thrust of the disks and is brought within or close to the top end of the bearing. Side motion is thus prevented and the life of the different parts prolonged. The nut is clamped in position so that it can be rotated to bring a new surface of the friction belt on the fly wheel to the position of maximum wear and thereby prolong the life of the friction belt.

The rim of the fly wheel is demountable. It is contemplated keeping an extra rim in stock so that when the friction surface needs renewing it can be done without interruption to the work.

The cross head is amply supported by the rectangular posts. The renewable liners enable the press to be kept in fine order and adjustment. The knockout mechanism is semi-automatic and simple.

The thrust and main bearings are modern and efficient, and the whole press has been designed to give the maximum output with minimum amount of upkeep.

All the parts are heavy and well proportioned to withstand the strains incident to the work.

The machine consists of a base or table 1 and a top bracket 2. The base and bracket are connected by posts 8 rectangular in cross section. The ends of the posts are threaded and secured to the base and bracket by means of nuts 9.

The top bracket 2 carries the horizontal drive shaft 100 on which are keyed two friction disks 4. One end of the drive shaft carries tight and loose pulleys 102 and 103.

The main vertical power screw 11 screws into a threaded nut 14 which is secured to the bottom side of the bracket 2 by means of clamp 19. The upper end of the screw 11 has a sleeve 12 secured to it. 13 is a bush, located in the central portion of the top bracket 2 in which the sleeve 12 has a vertical movement up or down according as the fly wheel 3 is rotated either to the right or left.

A cross head 6 is attached to the lower end of the screw 11 by means of half sleeves 15. A hard plate 16 is placed in the bottom of the central hole in the cross head to take the strain of the blow caused by the inertia of the fly wheel on the down stroke. A gib 7 is attached to the cross head at each end in an angular plane so that movement of the gib up and down with respect to the cross head will take up any lost motion in the latter. I make this adjustment by means of screws. The gibs 7 fit around the rectangular posts 8, and a liner 10 is interposed between the gibs. This liner may be renewed when worn to compensate for the up and down motion of the cross head and gibs. This adjustment insures the proper arrangement and disposition of the dies and die ring when engaging each other.

Absolute alinement is necessary for the proper working of the press inasmuch as there is very small clearance between the dies and die ring.

The upper die D is attached by means of bolts to the cross head. The lower die ring R is bolted to the base or table and in this type of machine is stationary.

The die ring in this particular machine is designed to move up and down over the lower die or dies. The extent of the vertical movement of the die ring is approximately three times the thickness of the finished tile. This movement of the die ring also provides the necessary space for the dust in forming the tile, the die ring moving up over the lower die a certain degree to perform this function.

When the tile are formed the upper die enters the die ring and firmly presses down the dust. The approximate pressure is about one ton to the square inch, preferably by a series of repeated pressings, after which the tile is ejected from the die. At this point the upper cross head and die have moved upward out of the way, after which the die ring is pushed downward over the lower stationary die.

Factory practice varies somewhat in the precise method of pressing the tile. A flat top plate is used in some cases engaging the die ring, and the die ring moves down over the lower die, thus compressing the top plate and die ring simultaneously. The finished tile are located just at the top of the die ring.

In the machine described in which my invention has been applied the tile are formed in the lower portion of the die ring with entering dies and means for ejecting or removing the tile.

The die ring R is attached to the standards 48 one on either side of the die ring and these standards are guided in bushes 50 at the lower end and in bushes 51 at the top. Bush 51 is shrouded with the dust guard 52 constituting a seat for the die ring when the nut on the top end of the standard is tightened. The lower ends of the standards 48 are provided with a yoke 47 serving to keep the standards in slide alinement and to raise and lower the attached die ring.

Yoke 47 is connected by links 45 and pins 46 to a lever 44 on rock shaft 42 in the base 1, and secured by caps 43.

A double lever 37 is mounted on one end of the rock shaft 42 and is free to turn except as it is restrained by safety pin 41 engaging the lever 39 keyed to the shaft 42. Bushes 40 are inserted in the lever 39 and the double lever 37. To the latter are attached two push rods 29 and 30 by means of adjusters 35. These adjusters are pivoted to the double lever 37 by pins 38. The collar 36 prevents the rock shaft 42 moving endwise due to such tendency on account of the shearing action of the pin 41 on the latter when either strained or cut off.

The push rods 29 and 30 are threaded at each end. The bottom ends are secured to the adjusters 35 by means of a clamp when the proper adjustment is made.

Hand wheels 32 are placed on the push rods 29 and 30 for convenience of adjustment. The upper ends of the push rods are guided by bearing 33 secured to a guide bracket 34. This adjustment admits of the free movement of the rock shaft whenever either of the push rods is moved either up or down.

Bracket 34 is secured to one of the posts 8. A hard push rod cap 31 is placed on the top of each push rod 29 and 30 and they serve as seats for a hard cone point 56.

The cone point is on the regulator rod 55 that actuates the rock shaft.

The die ring standards 48 are balanced by springs 49 on the base 1. A washer 53 on a shoulder of the standards transfers the pressure of the springs to the die ring standards.

The lower ends of the springs are retained in compression by the bushes 50.

On the opposite end of the rock shaft 42 heretofore referred to is bolted a friction plate 120 which works between two brake bars 121. These brake bars are retained in position by pins 122 on the frame. A spring 123 is adjusted to tighten up the brake bar 121 a sufficient amount to produce friction enough to retain the die ring wherever it may be pushed by the push rods or by the stop placed on the upper dies. Bolts 54 secure the caps and the rock shaft in position.

This arrangement makes a free working unit and there is no tendency of the die ring to drop down or sag.

A pinion 21 is keyed to the drive shaft 100 and drives a disk shaped gear 22 keyed to an eccentric shaft 23 journaled in the top bracket 2. On the eccentric end of the shaft 23 an eccentric strap and rod 25 are connected and held in place by cap 26. Rod 25 is secured to a connecting rod 28. The opposite end of the connecting rod 28 is journaled in bracket arm 27 of the bracket 2. The eccentric strap and rod are free to move up and down upon the rotation of the drive shaft. The lower end of the connecting rod describes somewhat of an arc of a circle.

The regulator rod 55 before referred to, which is connected with the rod 25 and pinned to the connector 28, has on its lower end a cone point 56. The lower end of the regulator rod 55 is connected by the connector 59 working in a guide 57 and a spring 58, which gives a yielding movement or motion when the point 56 comes in contact with either of the cups 31.

Motion from the above described mechanism causes the cone point 56 to contact with one of the cups 31 on the adjuster rods so that the cone point will move downwardly one or the other of the push rods 29 or 30, and also move the die ring whenever the cone point is pushed over from one to the other.

The opposite end of the connector 59 is attached to a hand lever 60. This hand lever is attached to the shaft 62 which is journaled in the bracket 61. The opposite end of the shaft 62 has a trip lever 63 attached. On the cross head 6 a trip 64 is mounted on a base 65. A small spring keeps the trip 64 in normal position.

The trip 64 is so arranged that when the cross head descends to make a quantity of tile the trip moves sidewise out of the way when in contact with lever 63, but on the upstroke of the cross head the trip engages and moves the lever 63 outwardly throwing over the cone point so that it will contact with that push rod cup which presses down the die ring, and strips said ring from the tile just formed.

The dust is carried in a manually operated box or charger C which charges the die ring R, the box being arranged to slide between metal guide strips S secured at the parallel sides or edges of the horizontal charging table C', which table is fashioned with a perforated portion C² forming the carry-off table for the completed tile. The strips guide the box so that when the operator pushes it forward, the box comes directly over the cavity of the die ring R and drops the dust into the cavity thereof whenever they are presented.

On the side of the charge box C is attached a lug C³ which contacts with the free end of a trip lever 66. This trip lever is pivoted at 68 (Fig. 14) to the bottom side of the bracket 61 on its downwardly projecting lug. One end of the trip lever 66 is connected to the hand lever 60 by means of the toggle connector 67. When the charge box is moved forward the cone point on the end of the regulator rod is moved backward, and comes in contact with the rear push rod.

The regulator rod is moving up and down. When it next descends it pushes the rear push rod down and raises the die ring up over the lower stationary die, making a suitable cavity for the dust from the charger. The charger is then withdrawn with the usual shaking motion to insure that the dust has properly charged the mold. The upper die is then ready to form the tile.

83 is a hand lever for controlling the movement of the upper die, and is pivoted to a bracket 84 secured to the base or table. A connecting rod 85 is secured to the hand lever by means of one end 86 and a pin 87 whereby the rod is operated in a vertical plane in unison with the vertical movement of the upper die.

85 is a connecting rod the upper end of which is pivoted to a lever 79 attached to a shaft 80 journaled in the top bracket 2. A lever 78 is connected to the shaft 80 and to an operating thrust lever 76 by means of the connector 77 and pins 81 and 82. This lever 76 is fulcrumed to the bracket 2 by the pin 81'. The upper end of lever 76 is engaged by an operating lever thrust bearing 75. This bearing is on the shaft 100 and is held in proper position by collars and a lock nut.

The friction disks 4 are keyed to shaft 100 and locked by nuts 105, and they are adjusted so that there is a slight amount of play between them and the outside of the friction band on the fly wheel 3. A leather rim is secured to the periphery of the fly wheel and adapted to come in contact with either of the disks 4 when the hand lever 83 is operated. When the operator pushes up or down the direction of the rotation of the disks will cause the cross head and upper die to move down or up.

On the connecting rod 85 is secured a collar 88 and a complementary stop finger 88ª, surrounding the rod 85, is secured on the cross head so that when the cross head comes up to a point that would tend to wreck the machine they automatically trip the connecting rod and throw the operating disk out of engagement with the fly wheel. This motion continued sufficiently will reverse the machine automatically by throwing the opposite disk into engagement with the fly wheel.

The machine is semi-automatic. The operator controls the operating lever and the movement of the upper die up and down. The operator also controls the charger box in its movement to and fro, and controls the cavities for the dust in the die ring. It is to be understood, that on the upstroke of the screw and fly wheel there is sufficient momentum of the fly wheel to compress the springs 109 when the fly wheel 3 comes in contact with the brake block carried by the cross piece 107. This compression of the springs 109 on top of the cross piece 107 creates sufficient friction between the brake block and the top of the fly wheel 3 to prevent the latter from moving freely and thus running down.

To prevent the fly wheel from running down and possibly causing damage a friction brake is applied to the upper side of the wheel to restrain and hold the fly wheel in its proper position. A brake top bar 107 works over rods 108 for this purpose, the rods being attached to the bottom bar 106. The latter is secured to the top bracket 2. On the top bar 107 preferably a wood block 111 is secured, which comes into engagement with the fly wheel at the end of the up stroke. Spring 109 creating friction is interposed between the top end of the stud or rod 108 and the top bar 107. The vertically operated connecting rod 85 and its collar 88, which contacts with the stop finger 88ª on the cross head 6, control the upward movement of the fly wheel and screw to an extent that the inertia of the fly wheel is partly overcome before the wheel comes in contact with the brake 111, and the main function of the brake 111 is to hold the fly wheel up, rather than to stop it. The stopping of the fly wheel is accomplished through the collar 88 and stop finger 88ª.

A belt shifter is employed for shifting the tight and loose pulleys. The belt shifter is carried on bracket 93 and is secured to the top bracket 2. The shifter rod 92 works in bracket 93 and carries the shifter fingers 91. Pin 90 is secured to the rod 92 and engages lever 94. This lever is attached to the shaft 95 journaled in the top bracket. The opposite end of the shaft 95 carries the hand lever 97. Collars position the shaft in the top bracket.

The hand lever mechanism is balanced by spring 119 against a stop 117 and held in position by pin 118. The balancing effect of this spring is always to throw the friction disk which controls the ascent of the cross head into position, the fly wheel running automatically to its topmost position.

The balancing effect just described tends to create a quick rebound and a quicker second and third blow on the tile. The first blow is usually not sufficient, two being usually necessary, and in some cases more than two blows are employed to produce good tile.

When, for example, a flat top die was used and pushed down the die ring, occasionally the die ring regulator shaft with its cone point did not return to its normal position on the center between the two push rod cups. When this happened it was possible for the cone point to descend more than once, contacting with the cup. When the flat top die pushed the die ring down the corresponding cup would raise.

This causes interference between the cone point and the cup which raises the die ring. To insure that this could not happen I secure the spring 128 to the rear die ring push-rod guide 33. This spring 128 deflects the ring regulator and cone point 56 so that it cannot make more than one stroke at each cycle of operation which insures contact of the cup 31 and the cone point 56.

In adjusting my machine for the purpose of making thicker tile than the ordinary pressed tile I increase the travel of the die ring by providing a new eccentric of different eccentricity on the shaft 23. To provide for this re-adjustment I employ a slide 133.

The connector 59 and guide 57 are disconnected from the regulator rod and attached to the guide way 133. A roller 136 and a pin to correspond therewith are connected with the die ring regulator rod 55 so that the end of the die ring regulator rod is controlled by the guide way 133. With this construction a longer stroke is given to the cone point 56 without throwing it on an arc and so that it will come into fair contact with the cups. This arrangement and adjustment are used only on presses where an excessive amount of motion is required of the die ring to make a deep fill for thick tile.

The following is a brief description of the figures of drawing.

Figure 1 is a front elevation of a machine embodying the invention.

Figure 2 is a view in front elevation with parts omitted and showing also some parts in vertical section.

Figure 3 is a side elevation of the machine as seen from the left in Figure 1.

Figure 4 is a sectional detail view of the belt shifter for the drive pulleys.

Figure 5 is a detail elevation of the drive wheel brake device.

Figure 6 is an enlarged detail view in top plan of the double lever for the two push rods which are shown in transverse section, showing also the safety pin in dotted lines.

Figure 7 is a top plan view of the cross head with the supporting posts in section and illustrating also the regulating device.

Figure 8 is an enlarged detail front view of the trip device carried by the cross head.

Figure 9 is a top plan view of the trip device of Figure 8.

Figure 10 is an enlarged detail view partly in section showing the relation of the cone point and cup of the regulator.

Figure 11 is a detail side view of the friction brake device for the rock shaft.

Figure 12 is an edge view of the device of Figure 11.

Figure 13 is a detail view of a modified regulator device for use when making thicker tile.

Figure 14:
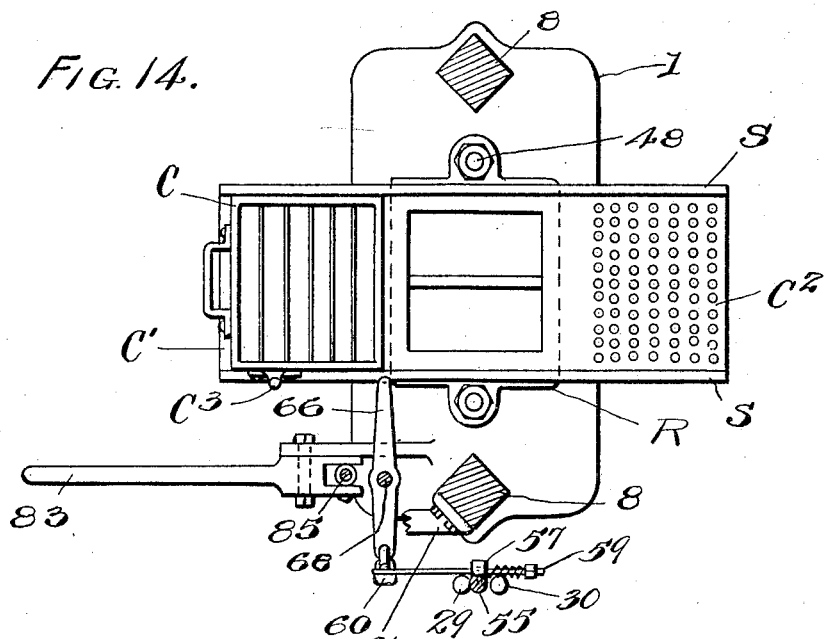
Figure 14 is a plan view, with posts and other parts in section, showing the base, charger table, the manually controlled charger or charging box, and the relation thereto of the trip lever.
Figure 15:
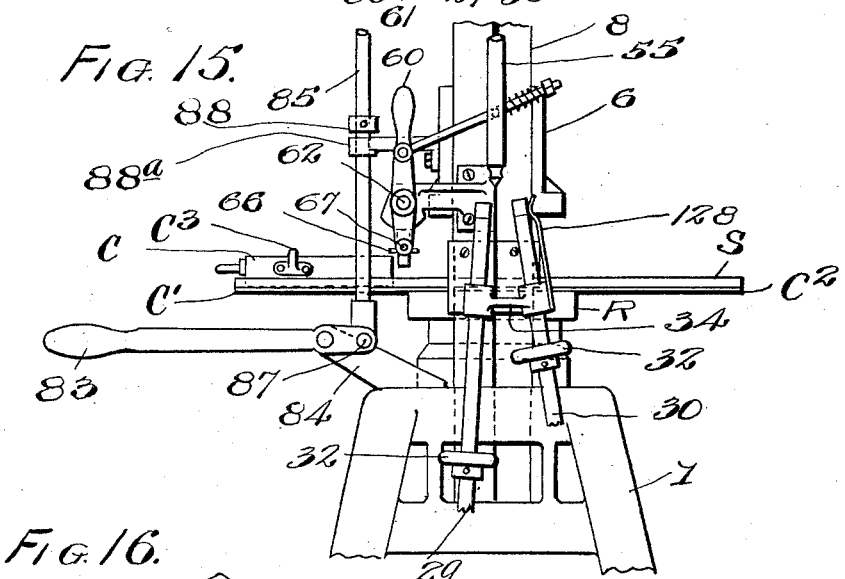
Figure 15 is a view in side elevation of parts in Fig. 14.
Figure 16:
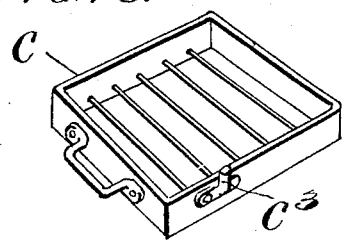
Figure 16 is a perspective view of the charger or charging box.

Claims.

1. In a press the combination of a base, a top bracket, intermediate supporting posts of rectangular section, a horizontal drive shaft in the top bracket, a main screw, a main nut on the bracket, a sleeve on the screw, a bush surrounding the sleeve in the bracket, and a horizontal cross head on the screw having wear adjusting parts between it and the supporting posts.

2. In a press, the combination of a die frame adapted for relative movement through the base die, a movable frame support therefor guided by the base, a rock shaft in the base, linkage between the die frame and shaft, and adjuster push rod mechanism for actuating the die frame manually or automatically.

3. In a press the combination of a die frame adapted for reciprocable movement, an operating shaft therefor and means for relieving said shaft from overstrain.

4. In a press the combination of a reciprocating die frame, means for balancing its weight and an adjustably-set friction brake to retain the frame in any position to which it is moved.

5. In a press a drive shaft and pinion in the top bracket, a gear meshing therewith, an eccentric and shaft journaled in said bracket, an eccentric strap and rod, a connecting rod pivoted to the eccentric rod and frame, and means below the eccentric for actuating the die movements to measure the charge and eject the finished tile.

6. In a press, the combination with an eccentric rod mechanism, a regulator rod connected thereto, contacting means on the lower end of the regulator rod, and yielding and guiding means for yieldingly bringing the frame adjusting mechanism in contact therewith.

7. In a press, the combination of a push rod, mechanism for actuating the die frame, and a trip on the cross head adapted on its upstroke to operate the push rod mechanism to push the die frame downwardly.

8. In a press the combination of a die frame, a charger box to slide thereon, a projection on the box, a trip lever on the main frame, and connections between the trip lever and a hand lever pivoted on the main frame, whereby the regulator push rod mechanism actuates the die frame to raise the same.

9. In a press the combination of a pivoted hand lever, a connecting rod, a lever connected thereto, and to a shaft in the top bracket, an operating thrust lever, connections for reciprocating the upper die and means for automatically measuring the charge and ejecting the finished tile.

10. In a press, the combination with a friction wheel and oppositely disposed friction disks rotatably mounted upon a sliding shaft, a lever mechanism for operating the same comprising a vertically movable connecting rod with a stop thereon, a cross head and a stop member thereon adapted for co-action with the stop to automatically trip the rod and release the operating disk or throw in the opposite one.

11. In a semi-automatic press the combination with an upper die and a charging device of manually operated means for controlling both the upper die and the charging device, whereby the charge is measured and the finished tile ejected from the press, and automatic means for performing the other operations of the machine.

12. In a press, a brake, a screw friction fly wheel, a brake bar above the wheel, a bottom bar, yieldable connections between said bars, and spring balancing mechanism acting to throw the friction disk into position effecting the ascent of the crosshead, an abutment on the cross head, and a connecting rod having a co-acting stop thereon to control the upward movement of the fly wheel and screw.

13. In a press the combination with a die frame mechanism, of a spring secured to the rear push-rod guide for deflecting the die regulator and confine it to one stroke at each cycle.

14. In a press, the combination with the die frame mechanism, the regulator rod provided with a roller, and a slide or guide way for controlling the regulator rod by the guide way whereby the die is charged and the finished tile ejected.

15. In a press, the combination of a die frame, a rock shaft linked thereto, pusher shafts pivoted thereto, and a regulator rod adapted to make variable contact with the pusher rods.

16. In a press the combination with a die frame, a rock shaft linked thereto, pusher rods pivoted to the rock shaft, means for yieldingly controlling the movement of the rock shaft, and a regulator rod adapted to make variable contact with the pusher rods.

17. In a press, the combination of a table base made in one piece having means for supporting a die and die frame, standards for supporting the upper operating mechanism, and lever mechanism for inaugurating automatic and semi-automatic operations whereby the charge is measured and the finished tile ejected from the press.

18. In a press the combination of a top bracket and a cross head, a friction drive wheel having a bearing in the bracket, a disk shaft in the bracket and disks on the shaft oppositely disposed so that the fly wheel rim takes the side thrust of the disks within or close to the bearing in the top bracket.

19. In a press, the combination of a friction drive wheel having a demountable rim and a friction member on the rim, a disk shaft, and oppositely disposed friction disks thereon for co-action with the friction member.

20. In a press the combination of a friction fly wheel provided with an open, flanged demountable rim supported on the wheel, and means for attaching said rim to the wheel.

FRANK B. YINGLING.